United States Patent
Yang et al.

(10) Patent No.: US 12,038,282 B2
(45) Date of Patent: Jul. 16, 2024

(54) MEMS SINGLE-AXIS GYROSCOPE

(71) Applicant: AAC Kaitai Technologies (Wuhan) CO., LTD, Hubei (CN)

(72) Inventors: Shan Yang, Shenzhen (CN); Hongtao Peng, Shenzhen (CN); Zhan Zhan, Shenzhen (CN); Shitao Yan, Shenzhen (CN); Zhao Ma, Shenzhen (CN); Xiao Kan, Shenzhen (CN); Kahkeen Lai, Singapore (SG); Veronica Tan, Singapore (SG)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 218 days.

(21) Appl. No.: 17/873,154

(22) Filed: Jul. 26, 2022

(65) Prior Publication Data

US 2023/0314137 A1  Oct. 5, 2023

(30) Foreign Application Priority Data

Mar. 30, 2022 (CN) .......................... 202210323886.8

(51) Int. Cl.
  *G01C 19/5712* (2012.01)
(52) U.S. Cl.
  CPC ................................ *G01C 19/5712* (2013.01)
(58) Field of Classification Search
  CPC ............ G01C 19/5712; G01C 19/5656; G01C 19/5649; G01C 19/5663
  See application file for complete search history.

(56) References Cited

U.S. PATENT DOCUMENTS

| | | | |
|---|---|---|---|
| 2017/0350701 A1* | 12/2017 | Geisberger | G01C 19/5747 |
| 2018/0118557 A1* | 5/2018 | Endean | B81B 3/0072 |
| 2020/0292313 A1* | 9/2020 | Endean | G01C 19/5621 |
| 2021/0033397 A1* | 2/2021 | Takizawa | G01C 19/5712 |
| 2023/0266122 A1* | 8/2023 | Ma | G01C 19/5712 |
| | | | 73/504.12 |
| 2023/0266125 A1* | 8/2023 | Ma | G01C 19/5747 |
| | | | 73/504.12 |

* cited by examiner

*Primary Examiner* — David J Bolduc
(74) *Attorney, Agent, or Firm* — W&G Law Group

(57) ABSTRACT

A MEMS single-axis gyroscope includes an anchor point structure, a sensing unit elastically connected with the anchor point structure, and a driving decoupling structure elastically connected with the anchor point structure and the sensing unit. The sensing unit includes a plurality of mass blocks arranged side by side and rocker connecting pieces. Each of the rocker connecting pieces is connected between corresponding two adjacent mass blocks. Connecting positions between each of the rocker connecting pieces and the corresponding two adjacent mass blocks are located on a same side of the line connecting the centers of the plurality of mass blocks. The MEMS single-axis gyroscope is able to perform differential detection, which resists interference of external electrical and mechanical noise, and improves a signal-to-noise ratio. By adjusting the rocker connecting pieces arranged between each two adjacent mass blocks, a total vector displacement of the plurality of mass blocks is zero.

10 Claims, 4 Drawing Sheets

MEMS SINGLE-AXIS GYROSCOPE

TECHNICAL FIELD

The present disclosure relates to a technical field of gyroscope technology, and in particular to a MEMS single-axis gyroscope.

BACKGROUND

A gyroscope is a device for sensing and maintaining direction. It is used to detect deflection of physical quantities and angular velocity of rotation of an object where it is installed in is tilted. The gyroscope is mostly used in navigation systems, positioning systems and other systems. For example, the gyroscope is used in mobile phone GPS positioning and navigation, somatosensory game consoles, and satellite gyroscopes, positioning, etc.

The CN patent application No. 201180019449.7 discloses a MEMS structure of an angular velocity sensor, which adopts a double-mass butterfly wing structure. Two axes of the MEMS structure in a horizontal plane are symmetrically arranged. A base of the MEMS structure has a function of relieving stress. Both of a driving circuit and a detecting circuit adopt closed-loop control. The double-mass butterfly wing structure is two vibrating wheel structures with coupled vibration. The gyroscope uses the negative stiffness effect to tune the drive mode and the detection mode, and the gyroscope at the same time compensates quadrature error to solve a problem of external torsional vibration coupling of a resonator. The MEMS structure has characteristics of high precision, low noise, high stability, and has high anti-shock and anti-vibration capabilities. However, due to weak coupling between the double-mass butterfly wing structure of the MEMS structure, a displacement ratio of mass blocks is not guaranteed. The mass blocks are susceptible to acceleration shock, which affects measurement accuracy Therefore, it is necessary to improve the prior art and to provide a MEMS single-axis gyroscope with strong coupling between mass structures and ensuring a displacement ratio of the mass blocks.

SUMMARY

A purpose of the present disclosure provides a micro-electro-mechanical system (MEMS) single-axis gyroscope to solve a problem of weak coupling between the mass structures of a gyroscope and being unable to guarantee a displacement ratio of mass blocks in the prior art.

Technical solutions of the present disclosure are as follows

The present disclosure provide a MEMS single-axis gyroscope. The MEMS single-axis gyroscope comprises an anchor point structure, a sensing unit elastically connected with the anchor point structure, and a driving decoupling structure elastically connected with the anchor point structure and the sensing unit.

The sensing unit comprises a plurality of mass blocks arranged side by side and rocker connecting pieces. Each of the rocker connecting pieces is connected between corresponding two adjacent mass blocks. The plurality of mass blocks are symmetrically arranged with a line connecting centers of the plurality of mass blocks as a symmetry axis.

Each of the plurality of mass blocks comprises a main body and an elastic structure connected with the main body. An accommodating groove is defined on each main body. Each elastic structure is received in a corresponding accommodating groove. One end of each elastic structure away from a corresponding main body is connected with the anchor point structure.

Connecting positions between each of the rocker connecting pieces and the corresponding two adjacent mass blocks are located on a same side of the line connecting the centers of the plurality of mass blocks. The rocker connecting pieces are elastically connected with the anchor point structure.

Furthermore, each elastic structure comprises a first torsion beam and a second torsion beam perpendicularly intersecting with the first torsion beam. An intersection of each first torsion beam and a corresponding second torsion beam is located in a center of a corresponding mass block. The anchor point structure comprises central anchor points. Each of the central anchor points is connected with a corresponding intersection of each first torsion beam and the corresponding second torsion beam.

Furthermore, each of the rocker connecting pieces comprises an elastic rocker and a support beam cross-connected with the elastic rocker. Two ends of each elastic rocker are respectively connected with corresponding two adjacent mass blocks. The anchor point structure further comprises rocker anchor points. Two ends of each support beam are connected with a respective rocker anchor point.

Furthermore, a connecting position of a first end of each elastic rocker and the main body of a first mass block of the corresponding two adjacent mass blocks is close to an end of the first mass block of the corresponding two adjacent mass blocks. A connecting position of a second end of each elastic rocker and the main body of a second mass block of the corresponding two adjacent mass blocks is ways from an end of the second mass block of the corresponding two adjacent mass blocks.

Furthermore, at least three mass blocks arranged side by side are provided. Two rocker connecting pieces are respectively arranged on two sides of each two adjacent mass blocks. The rocker connecting pieces are symmetrically arranged with respect to the at least three mass blocks.

Furthermore, the rocker connecting pieces are symmetrically arranged with respect to the line connecting the centers of the plurality of mass blocks.

Furthermore, the driving decoupling structure comprises two driving decoupling pieces respectively disposed at two ends of each of the plurality of mass blocks, coupling beams connected with the driving decoupling pieces and ends of corresponding mass blocks, and an elastic anchor beam group. The coupling beams are connected with the two ends of each of the plurality of mass blocks.

The anchor point structure further comprises an anchor beam anchor point group connected with the elastic anchor beam group. The driving decoupling pieces extend in a direction parallel to the line connecting centers of the plurality of mass blocks. The coupling beams are arranged in gaps between the driving decoupling pieces and the plurality of mass blocks. The coupling beams extend in the direction parallel to the line connecting centers of the plurality of mass blocks.

Furthermore, the elastic anchor beam group comprises a plurality of first elastic anchor beams vertically connected with two ends of each of the driving decoupling pieces. A first end of each of the plurality of first elastic anchor beams is connected with one end of a corresponding driving decoupling piece. A second end of each of the plurality of first elastic anchor beams extends away from the corresponding driving decoupling piece. The anchor beam anchor point group comprises first anchor beam anchor points separately connected with the second end of each of the first elastic anchor beams away from the corresponding driving decoupling piece.

Furthermore, the elastic anchor beam group further comprises a plurality of second elastic anchor beams vertically connected with a middle portion of each of the driving decoupling pieces. A first end of each of the plurality of second elastic anchor beams is connected with a corresponding driving decoupling pieces. A second end of each of the plurality of second elastic anchor beams is far away from the corresponding driving decoupling piece. The anchor beam anchor point group further comprises a second anchor beam anchor points separately connected with the second end of each of the second elastic anchor beams away from the corresponding driving decoupling piece.

Furthermore, the MEMS single-axis gyroscope further comprises first transducers connected with the driving decoupling structure. The first transducers are any one or a combination of capacitive transducers, inductive transducers, pyroelectric transducers, and piezoelectric transducers.

Furthermore, each of the first transducer comprises a positive driving electrode and a negative driving electrode. Each positive driving electrode and each negative driving electrode are respectively arranged on an outer side of a respective driving decoupling piece.

Furthermore, the MEMS single-axis gyroscope further comprises second transducers arranged above or below the plurality of mass blocks. The second transducers are any one or the combination of the capacitive transducers, the inductive transducers, the pyroelectric transducers, and the piezoelectric transducers.

A principle of the present disclosure is as follows.

The plurality of mass blocks are respectively connected with the anchor point structure through the corresponding elastic structure, so that the plurality of mass blocks are capable of rotating in a plane where the mass blocks are located and swing out of the plane. Each two adjacent mass blocks are coupled to each other through the rocker connecting pieces, so that each two adjacent mass blocks rotate in opposite directions in the plane where the mass blocks are located and each two adjacent mass blocks waing in opposite directions out of the plane where they are located. The MEMS single-axis gyroscope of the present disclosure has two vibration modes. In a first vibration mode, the plurality of mass blocks rotate in the plane, which is defined as a drive mode. In the drive mode, due to action of the rocker connecting pieces, the rotation directions of each two adjacent mass blocks are opposite to each other. When the gyroscope is subjected to the Corelli force caused by an external angular velocity ω perpendicular to the rotation direction in the plane, according to the Coriolis principle, the angular velocity ω generates the Coriolis force orthogonal to the rotation direction in the plane, and the mass blocks swings outward under action of the Coriolis force, which is defined as a sense mode. Since the two ends of each of the plurality of mass block move in opposite directions in the drive mode, vibration directions of the two ends of each of the plurality of mass block in the sense mode are opposite. Further, since the rotation directions of each two adjacent mass blocks are opposite, vibration directions of same ends of each two adjacent mass blocks in the sense mode are opposite. Based on this, both of each of the plurality of mass blocks and each two adjacent mass blocks realize differential detection of the external angular velocity ω.

In the present disclosure, each of the plurality of mass blocks and each two adjacent mass blocks realize the differential detection, which resist interference of external electrical and mechanical noise and improve the signal-to-noise ratio of a device in which the MEMS single-axis gyroscope is mounted. By adjusting the rocker connecting pieces arranged between each two adjacent mass blocks, a total vector displacement of the plurality of mass blocks is zero, which realizes the torque balance of the mass blocks and avoids impact of external linear acceleration and angular acceleration. Compared with a conventional single-axis butterfly-wing gyroscope, the mass blocks of the present disclosure are strongly coupled through the rocker connecting pieces. Under the premise of the existence of processing errors, the displacement ratio of the plurality of mass blocks is zero and process redundancy of the device is improved.

DETAILED DESCRIPTION

The present invention will be further described below with reference to the accompanying drawings and embodiments.

Figure 1:
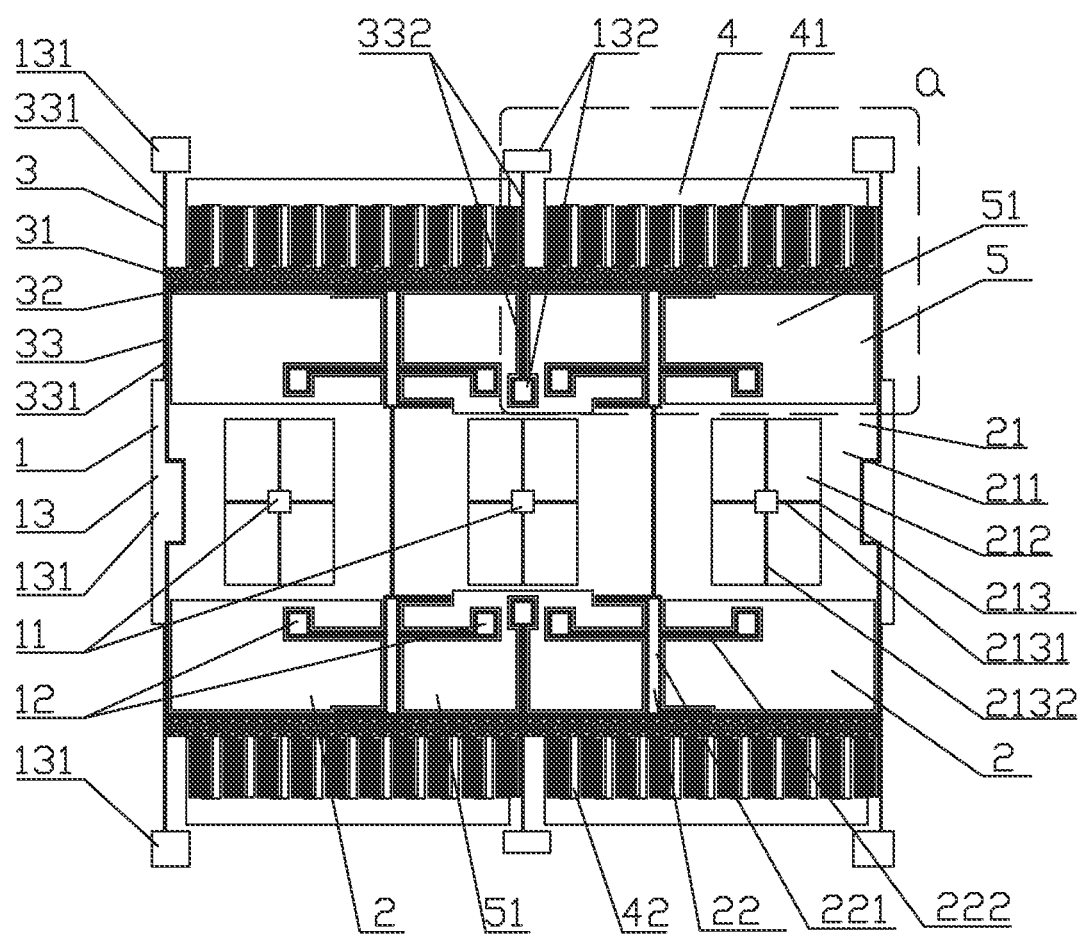
FIG. 1 is a top schematic diagram of a MEMS single-axis gyroscope according to one embodiment of the present disclosure.

As shown in FIG. 1, in one embodiment, the present disclosure provide a MEMS single-axis gyroscope. The MEMS single-axis gyroscope comprises an anchor point structure 1, a sensing unit 2 elastically connected with the anchor point structure, and a driving decoupling structure 3 elastically connected with the anchor point structure 1 and the sensing unit 2.

The sensing unit 2 comprises a plurality of mass blocks 21 arranged side by side and rocker connecting pieces 22. Each of the rocker connecting pieces 22 is connected between corresponding two adjacent mass blocks 21. The plurality of mass blocks 21 are symmetrically arranged with a line connecting centers of the plurality of mass blocks 21 as a symmetry axis. Each of the plurality of mass blocks 21 comprises a main body 211 and an elastic structure 213 connected with the main body 211. An accommodating groove 212 is defined on each main body 211. Each elastic structure 213 is received in a corresponding accommodating groove 212. One end of each elastic structure 213 away from a corresponding main body 211 is connected with the anchor point structure 1. Connecting positions between each of the rocker connecting pieces 22 and the corresponding two adjacent mass blocks 21 are located on a same side of the line connecting the centers of the plurality of mass blocks 21. The rocker connecting pieces are elastically connected with the anchor point structure 1.

Figure 3:
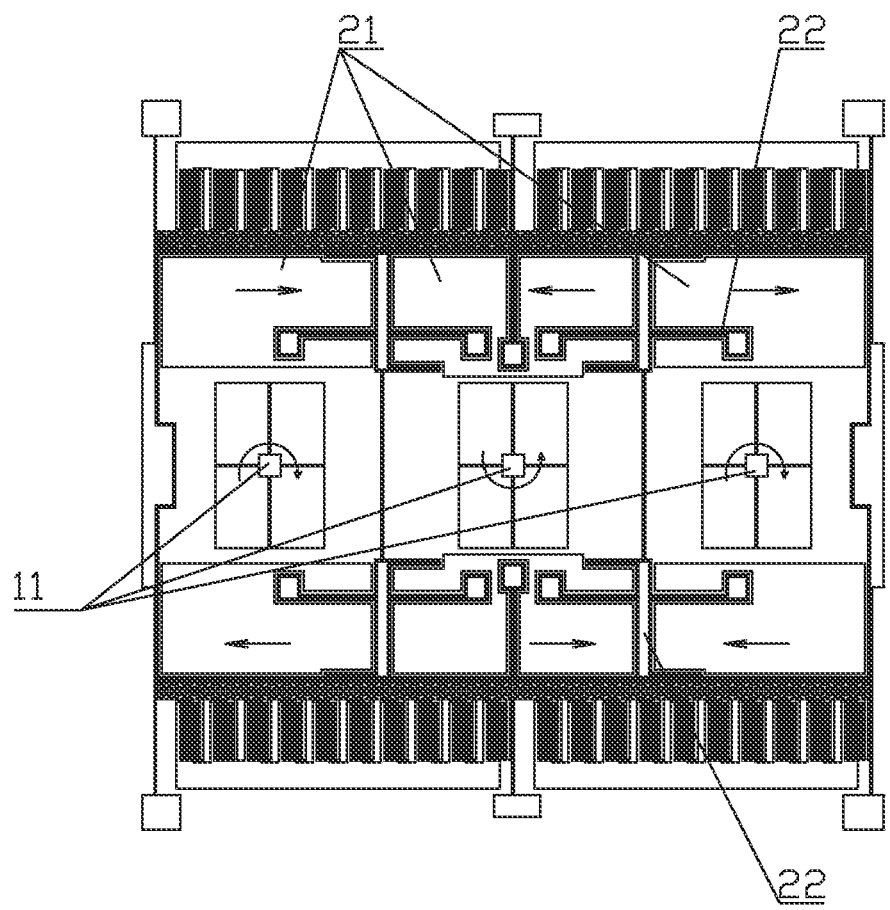
FIG. 3 is a schematic diagram of the MEMS single-axis gyroscope according to one embodiment of the present disclosure, shown in a drive mode.
Figure 4:
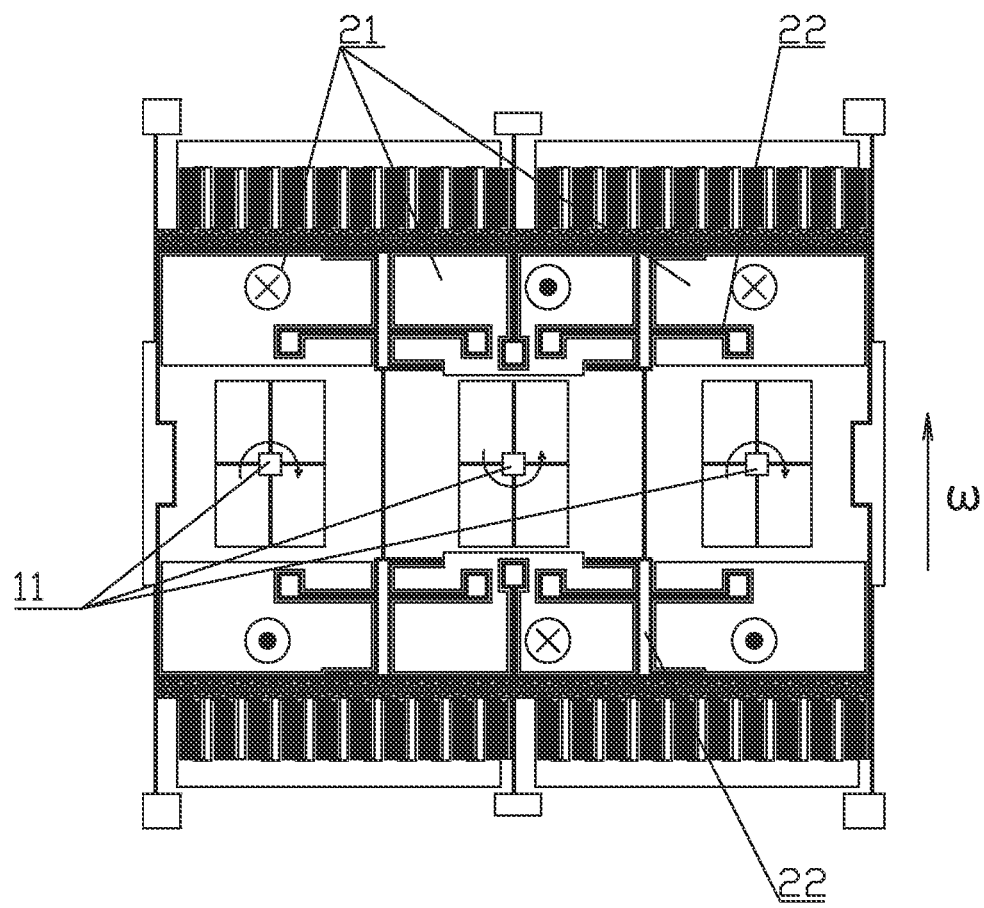
FIG. 4 is a schematic diagram of the MEMS single-axis gyroscope according to one embodiment of the present disclosure, shown in a sense mode.

In the embodiment, as shown in FIG. 3, in a drive mode, the plurality of mass blocks 21 rotate in a plane where the mass blocks are located, two ends of each of the plurality of mass blocks 21 move in a direction parallel to the line connecting the centers of the plurality of mass blocks 21. The two ends of the plurality of mass blocks 21 move in opposite directions. Due to action of the rocker connecting pieces 22, rotation directions of each two adjacent mass blocks 21 are opposite to each other, so same ends of each two adjacent mass blocks 21 move in opposite directions. FIG. 3 shows moving directions of three mass blocks 21 in the drive mode according to one embodiment of the present disclosure. When the MEMS single-axis gyroscope senses an external angular velocity ω perpendicular to the line connecting the centers of the plurality of mass blocks 21 in the plane, according to the Coriolis principle, the angular velocity ω generates the Coriolis force orthogonal to the rotation direction in the plane. Under the Coriolis force, the plurality of mass blocks 21 swing out of the axial plane Since two ends of a same mass block 21 move in opposite directions in the drive mode, the two ends of each of the plurality of mass blocks 21 vibrate in opposite directions in the sense mode. Furthermore, since the rotation directions of each two adjacent mass blocks are opposite, vibration directions of same ends of each two adjacent mass blocks in the sense mode are opposite. Based on this, both of each of the plurality of mass blocks and each two adjacent mass blocks realize differential detection of the external angular velocity ω. FIG. 4 shows the moving directions of the three mass blocks 21 in the sense mode excited by the angular velocity ω by the drive mode in FIG. 3.

In the embodiment, as shown in FIG. 1, each elastic structure 213 comprises a first torsion beam 2131 and a second torsion beam 2132 perpendicularly intersecting with the first torsion beam. An intersection of each first torsion beam 2131 and a corresponding second torsion beam 2132 is located in a center of a corresponding mass block 21. The anchor point structure 1 comprises central anchor points 11. Each of the central anchor points 11 is connected with a corresponding intersection of each first torsion beam 2131 and the corresponding second torsion beam 2132.

In the embodiment, as shown in FIG. 1, each of the rocker connecting pieces 22 comprises an elastic rocker 221 and a support beam 2221 cross-connected with the elastic rocker 221. Two ends of each elastic rocker 221 are respectively connected with the main body of corresponding two adjacent mass blocks 21. The anchor point structure 1 further comprises rocker anchor points 12. Two ends of each support beam 222 are connected with a respective rocker anchor point 12. A connecting position of a first end of each elastic rocker 221 and the main body 211 of a first mass block 21 of the corresponding two adjacent mass blocks 21 is close to an end of the first mass block 21 of the corresponding two adjacent mass blocks 21. A connecting position of a second end of each elastic rocker 221 and the main body 211 of a second mass block 21 of the corresponding two adjacent mass blocks 21 is ways from an end of the second mass block 21 of the corresponding two adjacent mass blocks 21.

By adjusting the connecting position of each elastic rocker 221 and the corresponding mass block 21, and/or adjusting the connecting position of each support beam 222 and the corresponding elastic rocker 221, each support beam 222 divides the corresponding elastic rocker 221 in a specific ratio and a total vector displacement of the plurality of mass blocks 21 is zero. Therefore, the torque balance of the plurality of mass blocks is realized, and impact of external linear acceleration and angular acceleration to plurality of mass blocks 21 is avoided. In some embodiments, each elastic rocker 221 is divided by the corresponding support beam 222 in a ratio of 1:1. That is, a distance from the intersection of each support beam 222 and the corresponding elastic rocker 221 to any one end of the two ends of the corresponding elastic rocker 221 is equal to a distance from the connecting position of each elastic rocker 221 and the corresponding mass block 21 to the elastic rocker 221. In other embodiments, each elastic rocker 221 is divided by the corresponding support beam 222 in a ratio of 2:1. In other embodiments, each elastic rocker 221 is divided by the corresponding support beam 222 in a ratio greater than 2:1.

In one embodiment, as shown in FIG. 1, at least three mass blocks 21 arranged side by side are provided. Two rocker connecting pieces 22 are respectively arranged on two sides of each two adjacent mass blocks 21. The rocker connecting pieces 22 are symmetrically arranged with respect to the at least three mass blocks 21. The rocker connecting pieces 22 are symmetrically arranged with respect to the line connecting the centers of the plurality of mass blocks 21. In the embodiment, by adjusting the connecting position of each elastic rocker 221 and the corresponding mass block 21, and/or adjusting the connecting position of each support beam 222 and the corresponding elastic rocker 221, a vector displacement of a middle mass block 21 is controlled to be twice the vector displacement of the other two mass blocks 21, which realizes the torque balance of the three mass blocks 21.

Figure 2:
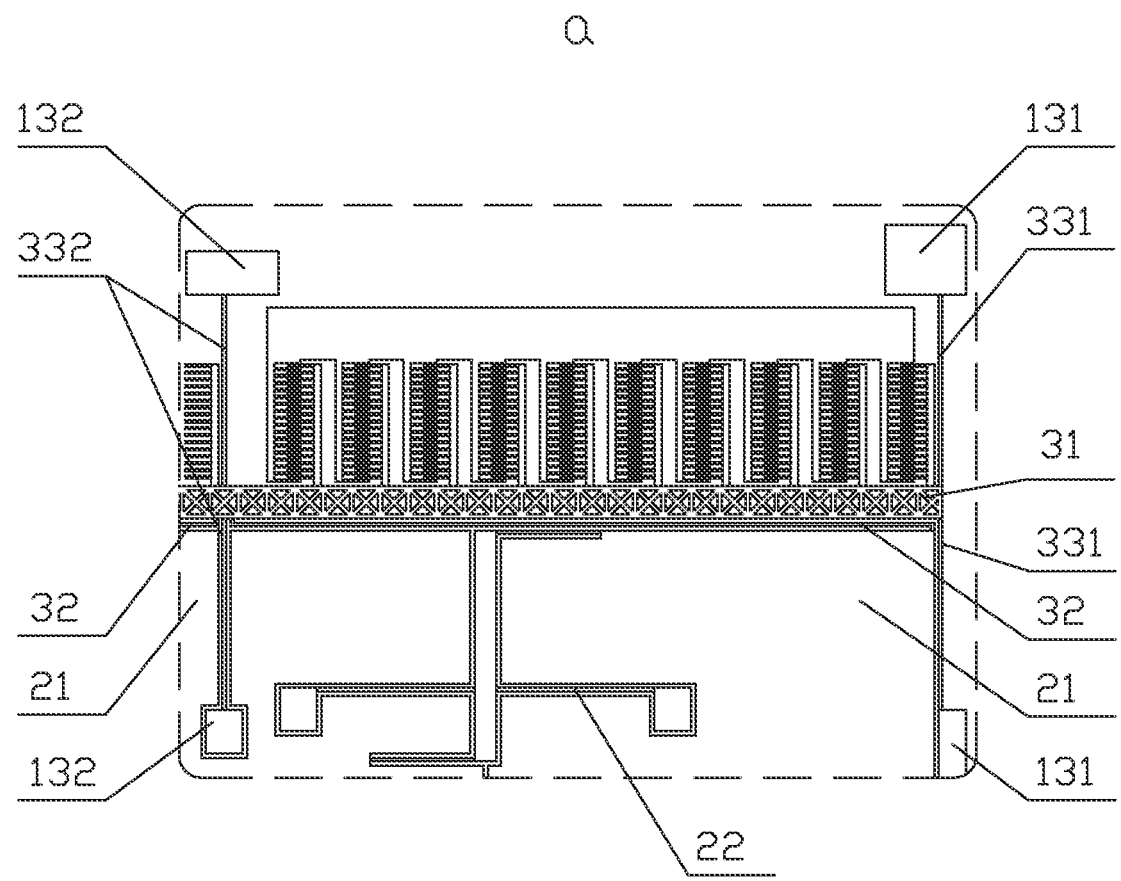
FIG. 2 is an enlarged view of portion A shown in FIG. 1.

In one embodiment, as shown in FIG. 1, the driving decoupling structure 3 comprises two driving decoupling pieces 31 respectively disposed at two ends of each of the plurality of mass blocks 21, coupling beams 32 connected with the driving decoupling pieces 31 and ends of the corresponding mass blocks, and an elastic anchor beam group 33. The coupling beams 32 are connected with the two ends of each of the plurality of mass blocks 21. The anchor point structure 1 comprises an anchor beam anchor point group 13 connected with the elastic anchor beam group 33. In the embodiment, as shown in FIG. 2, the driving decoupling pieces 31 extend in a direction parallel to the line connecting centers of the plurality of mass blocks 21. In the embodiment, two coupling beams 32 are provided. The two coupling beams 32 are respectively connected with corresponding ends of the two mass blocks 21 arranged on two sides of the sensing unit. The two coupling beams 32 are arranged in gaps between the driving decoupling pieces 31 and the plurality of mass blocks 21. The two coupling beams 32 extend in the direction parallel to the line connecting the centers of the plurality of mass blocks 21.

The driving decoupling pieces 31 and the coupling beams 32 have large stiffness in the direction parallel to the line connecting the centers of the three mass blocks 21. Therefore, in the drive mode, the driving decoupling pieces 31 and the coupling beams 32 are coupled with the three mass blocks 21 and drive the corresponding ends of the three mass blocks 21 to move in the direction parallel to the line connecting the centers of the three mass blocks 21. The driving decoupling pieces 31 have a large stiffness in a direction out of the plane, and the coupling beams 32 have a small stiffness in the direction out of the plane. Therefore, in the sense mode, the coupling beams 32 swings ou of the plane with the three mass blocks 21, and the driving decoupling pieces 31 keep still to realize decoupling of the driving decoupling pieces 31 from the mass blocks 21.

In the embodiment, as shown in FIG. 1, the elastic anchor beam group 33 comprises a plurality of first elastic anchor beams 331 vertically connected with two ends of each of the driving decoupling pieces 31. The first elastic anchor beams 331 connected by the two driving decoupling pieces 31 are symmetrically arranged with respect to the line connecting the centers of the three mass blocks 21. A first end of each of the plurality of first elastic anchor beams 331 is connected with one end of a corresponding driving decoupling piece 31. A second end of each of the plurality of first elastic anchor beams 331 extends away from the corresponding driving decoupling piece 31. The anchor beam anchor point group comprises first anchor beam anchor points 131 separately connected with the second end of each of the first elastic anchor beams 331 away from the corresponding driving decoupling piece 31. In the embodiment, two first elastic anchoring beams 331 are connected at any one of the two ends of each of the driving decoupling pieces 31, and each two first elastic anchoring beams 331 arranged on one end of each of the driving decoupling pieces 31 are arranged on two sides of the one end of each of the driving decoupling pieces 31.

The elastic anchor beam group 33 further comprises a plurality of second elastic anchor beams 332 vertically connected with a middle portion of each of the driving decoupling pieces 31. The second elastic anchor beams 332 connected by the two driving decoupling pieces 31 are symmetrically arranged with respect to the line connecting the centers of the three mass blocks 21. A first end of each of the plurality of second elastic anchor beams 332 is connected with a corresponding driving decoupling pieces 31. A second end of each of the plurality of second elastic anchor beams 332 is far away from the corresponding driving decoupling piece 31. The anchor beam anchor point group 13 further comprises a second anchor beam anchor points 132 separately connected with the second end of each of the second elastic anchor beams 332 away from the corresponding driving decoupling piece 31. In the embodiment, two second elastic anchoring beams 332 are connected at a middle portion of each of the driving decoupling pieces 31, and each two first elastic anchoring beams 331 connected with the corresponding driving decoupling pieces 31 are arranged on two sides of the corresponding driving decoupling pieces 31.

An extension direction of the first elastic anchor beams 331 and the second elastic anchor beams 332 is perpendicular to a moving direction of the driving decoupling structure 3 in the drive mode, so the first elastic anchor beams 331 and the second elastic anchoring beams 332 have small stiffness in a drive direction. In the drive mode, the driving decoupling structure 3 is coupled with the first elastic anchor beams 331 and the second elastic anchor beams 332, the first elastic anchor beams 331 and the second elastic anchor beams 332 moves in the direction parallel to the line connecting the centers of the plurality of mass blocks 21.

In the embodiment, as shown in FIG. 1, the MEMS single-axis gyroscope further comprises first transducers 4 connected with the driving decoupling structure 3. The first transducers 4 is any one or a combination of capacitive transducers, inductive transducers, pyroelectric transducers, and piezoelectric transducers.

In the embodiment, each of the first transducers 4 comprises a positive driving electrode 41 and a negative driving electrode 42. Each positive driving electrode 41 and each negative driving electrode 42 are respectively arranged on an outer side of a respective driving decoupling piece 31.

In the embodiment, as shown in FIG. 1, the MEMS single-axis gyroscope further comprises second transducers 5 arranged above or below the plurality of mass blocks 21. In the embodiment, the second transducers 5 are second transducers 51 arranged above two ends of each of the mass blocks 21. Each second transducer 51 is arranged above a corresponding end of the two ends of each of the three mass blocks 21.

The second transducers 5 is any one or the combination of the capacitive transducers, the inductive transducers, the pyroelectric transducers, and the piezoelectric transducers.

The above are only embodiments of the present disclosure. It should be pointed out that for those of ordinary skill in the art, improvements can be made without departing from the inventive concept of the present disclosure, which should fall within the protection scope of the present disclosure.

What is claimed is:

1. A micro-electro-mechanical system (MEMS) single-axis gyroscope, comprising:
   an anchor point structure;
   a sensing unit elastically connected with the anchor point structure; and
   a driving decoupling structure elastically connected with the anchor point structure and the sensing unit;
   wherein the sensing unit comprises a plurality of mass blocks arranged side by side and rocker connecting pieces; each of the rocker connecting pieces is connected between corresponding two adjacent mass blocks; the plurality of mass blocks are symmetrically arranged with a line connecting centers of the plurality of mass blocks as a symmetry axis;
   wherein each of the plurality of mass blocks comprises a main body and an elastic structure connected with the main body; an accommodating groove is defined on each main body; each elastic structure is received in a corresponding accommodating groove; one end of each elastic structure away from a corresponding main body is connected with the anchor point structure;
   wherein connecting positions between each of the rocker connecting pieces and the corresponding two adjacent mass blocks are located on a same side of the line connecting the centers of the plurality of mass blocks; the rocker connecting pieces are elastically connected with the anchor point structure.

2. The MEMS single-axis gyroscope according to claim 1, wherein each elastic structure comprises a first torsion beam and a second torsion beam perpendicularly intersecting with the first torsion beam; an intersection of each first torsion beam and a corresponding second torsion beam is located in a center of a corresponding mass block; the anchor point structure comprises central anchor points; each of the central anchor points is connected with a corresponding intersection of each first torsion beam and the corresponding second torsion beam.

3. The MEMS single-axis gyroscope according to claim 1, wherein each of the rocker connecting pieces comprises an elastic rocker and a support beam cross-connected with the elastic rocker; two ends of each elastic rocker are respectively connected with corresponding two adjacent mass blocks; the anchor point structure further comprises rocker anchor points; two ends of each support beam are connected with a respective rocker anchor point.

4. The MEMS single-axis gyroscope according to claim 3, wherein a connecting position of a first end of each elastic rocker and the main body of a first mass block of the corresponding two adjacent mass blocks is close to an end of the first mass block of the corresponding two adjacent mass blocks; a connecting position of a second end of each elastic rocker and the main body of a second mass block of the corresponding two adjacent mass blocks is ways from an end of the second mass block of the corresponding two adjacent mass blocks.

5. The MEMS single-axis gyroscope according to claim 1, wherein at least three mass blocks arranged side by side are provided; two rocker connecting pieces are respectively arranged on two sides of each two adjacent mass blocks; the rocker connecting pieces are symmetrically arranged with respect to the at least three mass blocks.

6. The MEMS single-axis gyroscope according to claim 1, wherein the rocker connecting pieces are symmetrically arranged with respect to the line connecting the centers of the plurality of mass blocks.

7. The MEMS single-axis gyroscope according to claim 1, wherein the driving decoupling structure comprises two driving decoupling pieces respectively disposed at two ends of each of the plurality of mass blocks, coupling beams connected with the driving decoupling pieces and ends of corresponding mass blocks, and an elastic anchor beam group; the coupling beams are connected with the two ends of each of the plurality of mass blocks;
   wherein the anchor point structure further comprises an anchor beam anchor point group connected with the elastic anchor beam group; the driving decoupling pieces extend in a direction parallel to the line connecting centers of the plurality of mass blocks; the coupling beams are arranged in gaps between the driving decoupling pieces and the plurality of mass blocks; the coupling beams extend in the direction parallel to the line connecting centers of the plurality of mass blocks.

8. The MEMS single-axis gyroscope according to claim 7, wherein the elastic anchor beam group comprises a plurality of first elastic anchor beams vertically connected with two ends of each of the driving decoupling pieces; a first end of each of the plurality of first elastic anchor beams is connected with one end of a corresponding driving decoupling piece; a second end of each of the plurality of first elastic anchor beams extends away from the corresponding driving decoupling piece; the anchor beam anchor point group comprises first anchor beam anchor points separately connected with the second end of each of the first elastic anchor beams away from the corresponding driving decoupling piece.

9. The MEMS single-axis gyroscope according to claim 8, wherein the elastic anchor beam group further comprises a plurality of second elastic anchor beams vertically connected with a middle portion of each of the driving decoupling pieces; a first end of each of the plurality of second elastic anchor beams is connected with a corresponding driving decoupling pieces; a second end of each of the plurality of second elastic anchor beams is far away from the corresponding driving decoupling piece; the anchor beam anchor point group further comprises a second anchor beam anchor points separately connected with the second end of each of the second elastic anchor beams away from the corresponding driving decoupling piece.

10. The MEMS single-axis gyroscope according to claim 1, wherein the MEMS single-axis gyroscope further comprises first transducers connected with the driving decoupling structure and second transducers arranged above or below the plurality of mass blocks; each of the first transducers comprises a positive driving electrode and a negative driving electrode; each positive driving electrode and each negative driving electrode are respectively arranged on an outer side of a respective driving decoupling piece.

* * * * *